(12) United States Patent
Ovens

(10) Patent No.: US 6,230,863 B1
(45) Date of Patent: May 15, 2001

(54) ACTUATOR ARRANGEMENT

(75) Inventor: David Peter Ovens, Rugby (GB)

(73) Assignee: Rover Group Limited, Warwick (GB)

( * ) Notice: Subject to any disclaimer, the term of this patent is extended or adjusted under 35 U.S.C. 154(b) by 0 days.

(21) Appl. No.: 09/422,930

(22) Filed: Oct. 21, 1999

(30) Foreign Application Priority Data

Nov. 14, 1998 (GB) .................................................. 9824950

(51) Int. Cl.⁷ ....................................................... B60N 2/02
(52) U.S. Cl. ............................................. 192/15; 297/367
(58) Field of Search ........................... 192/15, 19; 74/142, 74/143; 297/367, 378.12, 362.12, 378.1

(56) References Cited

U.S. PATENT DOCUMENTS 4,143,905 * 3/1979 Hensel et al. ............... 297/362.12 X
5,881,854 * 3/1999 Rougnon-Glasson .................. 192/15
6,095,608 * 8/2000 Ganot et al. ................. 297/378.12 X

* cited by examiner

Primary Examiner—Rodney H. Bonck
(74) Attorney, Agent, or Firm—Davis & Bujold, P.L.L.C.

(57) ABSTRACT

An actuator arrangement principally for use with the functional mechanisms of a motor vehicle seat. The arrangement including at least one handle member and associated pawl member respectively rotatable about a center and an actuator shaft. Each handle member including a snag aperture which cooperates with the associated pawl member such that upon rotation of the handle member about the center, the pawl member comes into snag abutment with respective portions of the snag aperture to limit the angular range of rotation for that member between a snag position and a lock position. Upon snag abutment, the actuator shaft is rotated in order to facilitate release or operation of a functional mechanism such as that for slide release/backrest fold or seat occupant comfort tilt.

11 Claims, 5 Drawing Sheets

ACTUATOR ARRANGEMENT

BACKGROUND OF THE INVENTION

The present invention relates to an actuator arrangement and more particularly to such an arrangement used with regard to a motor vehicle seat.

It will be appreciated that access to a motor vehicle interior is highly important to a vehicle owner along with occupant comfort. Thus, with regard to two door vehicles, it will be understood that the front seats generally slide and the backrests fold forwards in order to allow ready access to the rear seating/space of the vehicle. Clearly, it is also desirable that these front seats retain those features to which motor vehicle occupants have become accustomed such as backrest tilting for comfort, etc.

In such circumstances, it will be appreciated that typically a dual function release mechanism has been provided for front seating to allow the previously described front seat slide/backrest fold for access whilst retaining backrest tilt for comfort. These mechanisms have typically included two separate operational handles on one seat side or a single handle configured to allow bi-functionality such as through opposite rotations about the handle centre. Clearly, whether two handles or a single bi-functional handle is used there is the potential for seat occupant confusion and additional assembly costs for the vehicle manufacturer.

In addition to the potential for occupant confusion and inconvenience as indicated above, it will be appreciated that there is a safety aspect with regard to such actuation mechanisms in that if the slide/forward fold mechanism is released while driving, ie. rather than tilting a seat back for comfort, there is potential for loss of vehicle control.

SUMMARY OF THE INVENTION

It is an object of the present invention to provide an actuator arrangement for a seat which substantially relieves the above-mentioned problems.

In accordance with the present invention, there is provided an actuator arrangement for a seat in a vehicle, the arrangement comprising a handle member and a pawl member, the handle member arranged to rotate about a centre and including a snag aperture whilst the pawl member is arranged to rotate with and about an actuator shaft coupled to a functional mechanism and is cooperative with the snag aperture where rotation of the handle member one way about the centre is substantially free until the pawl member snags with a portion of the snag aperture whereupon the handle member is coupled to the pawl member and thus to the actuator shaft so further rotation of the handle about the centre precipitates rotation of the actuator shaft to facilitate and/or release the functional mechanism coupled to that actuator shaft.

The functional mechanisms which may be secured to the actuator shaft include a latch release for a vehicle seat slide and/or a back rest forward fold release and/or a progressive tilt mechanism for a seat.

The actuator shaft is preferably concentricity located within the snag aperture such that the pawl member only snags with the snag aperture when that snag aperture, as part of the handle member, is rotated one way in either a clockwise or anti-clockwise direction but not in both directions as it locks in that other direction. When not rotated into coupling snag abutment, the actuator shaft and pawl member may rotate in the snag aperture. Clearly, the actuator arrangement could also be arranged to operate in a vice versa scenario such that two actuator arrangements may be provided on a common actuator shaft for respective functional mechanisms, one turning the shaft clockwise for actuation and the other turning anti-clockwise for actuation of its functional mechanism.

Normally, the pawl member will include a proportion of its surface which has a reciprocal shape to that portion of the snag aperture engaged for snag coupling between the handle member and the actuator shaft. Such reciprocal shaping between the pawl member and the snag aperture facilitates keying and register therebetween for greater control of the functional mechanism.

Typically, the actuator shaft may have a square cross-section to ensure robust connection between the pawl member and the actuator shaft and so avoid potential slippage therebetween but, alternatively any positive drive association will be acceptable so a "D" cross-section or a spline or a keyed relationship may be used.

After snagging between the pawl member and the snag aperture, or more particularly at an intermediate position of the handle member where there is no snagging and the pawl member can rotate in the snag aperture, it may be desirable to provide a detent or magnetic or other latch to bias that position of the handle member to ensure retention of the handle member in that position unless an over rotational force or pressure is provided to initiate release therefrom.

Normally, the pawl member will generally take the form of a truncated circle with an engagement surface arranged to engage that portion of the snag aperture for coupling between the handle member and the actuator shaft. This truncated circle will furthermore be less than a notional base circle of the snag aperture to facilitate actuator arrangement operation such that the shaft and pawl member can respectively freely rotate or turn in the snag aperture when the handle member is not turned into snag abutment for functional mechanism actuation ie an intermediate position.

BRIEF DESCRIPTION OF THE DRAWINGS

Embodiments of the present invention will now be described by way of example only with reference to the accompanying drawings, in which.

DESCRIPTION OF PREFERRED EMBODIMENTS

Figure 1:
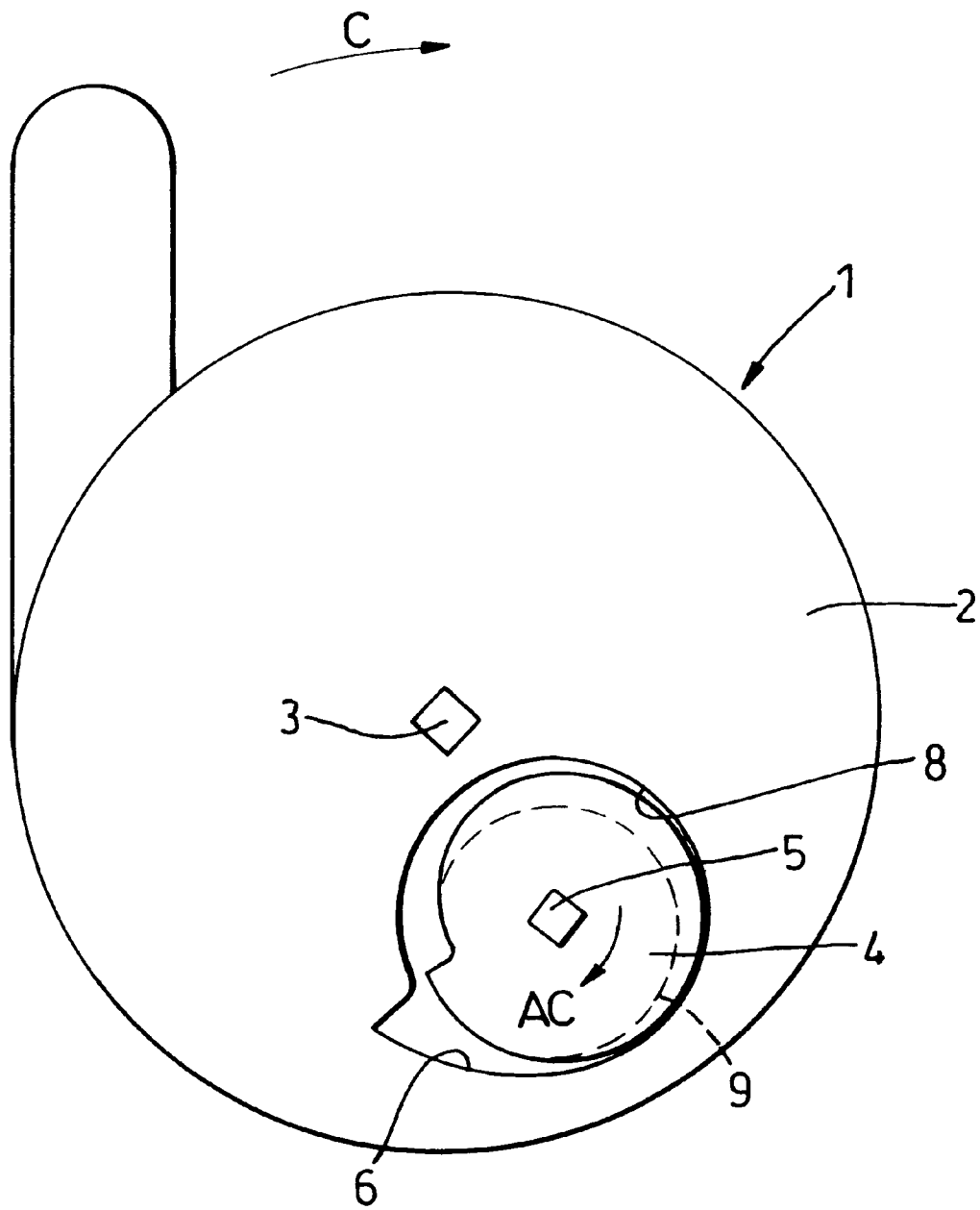
FIG. 1 is a pictorial front elevation of an actuator arrangement in a first configuration without snag abutment.
Figure 2:
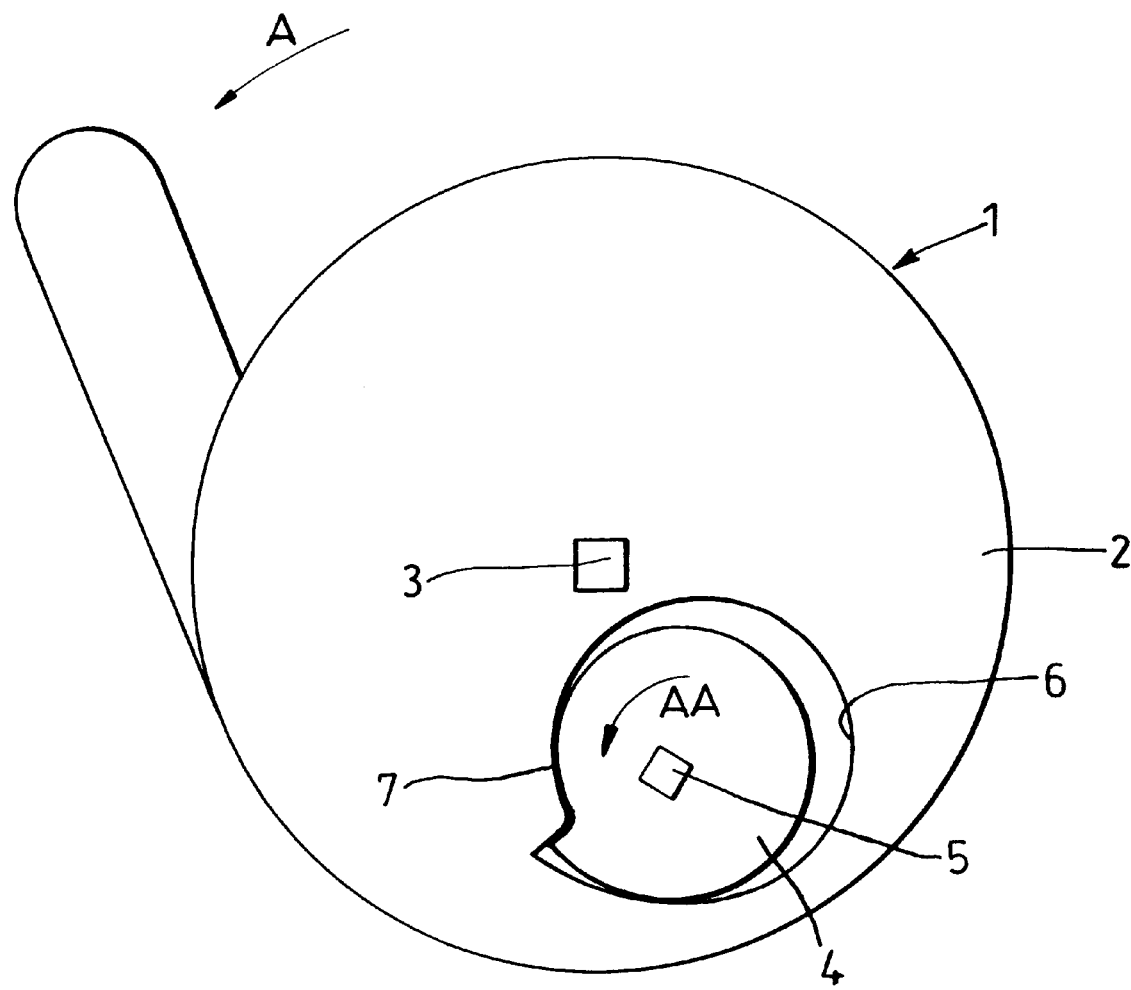
FIG. 2 is a pictorial illustration of the actuator arrangement depicted in FIG. 1 in a second configuration with snag abutment.

FIGS. 1 and 2 illustrate an actuator arrangement 1 comprising a handle member 2 rotatable in an anti-clockwise direction (arrow head A) about a centre 3. The handle member 2 includes a snag aperture 6 within which a pawl member 4 rotatable upon an actuator shaft 5 is located. This actuator shaft 5 is coupled to functional mechanisms such as a motor vehicle seat slide release/forward fold for easy access mechanism and/or seat comfort tilt mechanism.

FIGS. 1 and 2 effectively illustrate the ends of angular range through which the handle member 2 may rotate about the centre 3. In FIG. 1, the pawl member 4 is in contact a circumferential surface 8 of the snag aperture 6 such that the pawl member 4 although effectively contained by the aperture 6 of the handle member 2 can still freely rotate if the shaft 5 is turned by other means but further rotation of the handle member 2 in the clockwise direction C is prevented. In FIG. 2 the handle member 2 has been rotated in the anti-clockwise direction A such that the pawl member 4 robustly snag abuts a reciprocal portion 7 of the snag aperture 6 such that the snag therebetween couples the handle member 2 to the pawl member 4 and there is a driven rotation or turning of the actuator shaft 5 in the direction AA as a result of that handle member 2 rotation. This rotation of the actuator shaft 5 in the direction AA is sufficient to release or facilitate operation of a functional mechanism.

As indicated above, the present actuator arrangement can be used with regard to motor vehicle seat functional mechanisms such as those used for easy access, ie. release of forward slide/backrest fold along with backrest tilt adjustment for occupant comfort. These functional mechanisms typically include appropriate spring bias mechanisms such that the relatively small rotation in the direction AA is sufficient to release or facilitate operation of such functional mechanisms.

The present invention allows an inherently bi-functional actuator configuration to act as a single functional arrangement by putting one arrangement on each side of the seat for respective functional mechanisms associated about a common actuator shaft 5. The arrangement on one side only acts clockwise, the other arrangement only acts anti-clockwise, with each respective arrangement's handle member being appropriately locked when turned in their respectively non-actuating direction thereby removing confusion. Each pawl member is free to rotate within its associated snag aperture when the other arrangement is operated. Thus, it will be appreciated a rotation in the direction of arrow head A may initiate a seat slide/back rest forward fold whilst a rotation in the direction AC, due to another handle member (not shown) secured to an opposite side of a seat and rotated in the direction C, may release a seat backrest tilt mechanism or vice versa. The purpose of the present actuator arrangement 1 is to switch into operation these respective functional mechanisms. Thus, each mechanism will typically include appropriate biasing once the present actuation arrangement has overcome the initiation resistance through rotation of the actuator shaft 5 to facilitate or release operation of that mechanism.

Clearly, the handle member 2 may be biased towards a position between those depicted in FIGS. 1 and 2, with rotation in the direction A when respective release or facilitation of a particular functional mechanism is necessary and the bias returning the handle member 2 back to its 'standby' position after such actuation. However, in order to ensure handle member 2 is firmly presented, it will be understood that the position illustrated in FIG. 1 is preferred. It is locking of handle member 2 which prevents further rotation in direction C whilst still allowing pawl member 4 rotation in the aperture 6 which is of paramount importance when determining the strength of bias away from snag abutment actuation to a 'standby' position.

In order to achieve good coupling between the pawl member 4 and the actuator shaft 5, it will be appreciated that typically this shaft 5 will have any appropriate positive drive association with the member 4 such as by a square cross-section which is less susceptible to slip rotation under load.

The pawl member 4 between the positions illustrated in FIGS. 1 and 2 will rotate or slide relative to the snag aperture 6. In such circumstances, it will be appreciated that through appropriate choice of materials or lubrication, the engaging surfaces between the pawl 4 and the walls of the snag apertures 6 will facilitate such rotation or slide.

It will be understood that the angular range between the respective snag actuation position (FIG. 2) and the lock position (FIG. 1) for the handle member 2 is determined principally by the shape and configuration, both absolute and relative, between this aperture 6 and the pawl member 4 along with the location of the shaft 5 relative to the centre 3. Clearly, fouling between this actuator shaft 5 and the respective walls of the snag aperture 6 provides the absolute limitations upon the range of rotation for the handle member 2.

Normally, as illustrated, the pawl member 4 will have a truncated circle cross-section. Thus, once a functional mechanism has been activated by the present arrangement, then the pawl member 4 once biased away from snag abutment will be able to rotate within a suitably sized and shaped snag aperture 6 in order to allow operation of that functional mechanism by rotation of the shaft 5. If the pawl member 4 has a reduced periphery and as illustrated by broken line 9, it will be appreciated that the angular range of rotation for the handle member 2 will be greater and, after bias back-off, the ease of rotation of the pawl member 4 along with the actuator shaft 5 after such functional mechanism actuation may be greatly improved through the better clearance between the pawl member 4 and the snag aperture 6. However and unfortunately, the potential for actuator arrangement malfunction, rattle and increased angular range between actuator positions may be unacceptable. It will be noted that the snag aperture 6 has a base circle defined across its minimum diameter. To allow rotation, after bias back-off out of snag abutment, the pawl member 4 should be sized less than this base circle.

As indicated above, the actuator shaft 5 may be arranged to be substantially concentric within the snag aperture 6 at some positions of the handle member 2, ie. lock position for the handle member 2 shown in FIG. 1, to facilitate functional mechanism operations by allowing rotation of the pawl member 4 on that shaft 5. However, clearly as the handle member 2 and therefore the snag aperture 6 is rotated, the concentric central position of the actuator shaft 5 will vary. It will be appreciated that the centre 3 and actuator shaft 5 have fixed positions and thus the pawl 4 and handle member 2 must orbit these fixed positions between the snag actuations of respective functional mechanisms. However, in accordance with the present invention, it will be appreciated that rotation of the actuator shaft 5, whether it be in the direction AC or AA, will only occur when there is abutment snagging between a pawl member and a snag aperture of an actuator arrangement, or their equivalents on an opposed handle member for rotation. Thus, the pawl member 4 will slide upon the surface of the snag aperture 6 until the snag abutment takes place for coupling of the rotation of the handle member 2 to the actuator shaft 5 for actuation of the functional mechanism.

One way of ensuring good register between the actuator arrangement in accordance with the present invention and the functional mechanism actuated by that arrangement is as illustrated in FIGS. 1 and 2 to provide reciprocal shaping between the portion of the pawl member 4 in snag abutment with the snag aperture 6 wall to which that pawl member 4 snag abuts. Thus, as illustrated in FIGS. 1 and 2, a reciprocal wall portion 7 of the snag aperture 6 has a wave indent which registers with a similar wave indent in the pawl member 4.

As indicated previously, typically the handle member 2 will normally be biased towards an intermediate or handle member lock position where shaft 5 rotation is freely allowed whereby respective functional mechanisms associated with the shaft 5 may be activated by alternative rotation of the shaft 5 by opposed handle members for each mechanism without fouling therebetween.

Although a circular configuration for the pawl member 4 is preferred, it will be appreciated that alternative shapes and relative dimensions can be used in order to achieve the most appropriate actuation of respective functional mechanisms at the position of snag abutment between that pawl member 4 and the snag aperture 6. However, typically, the shaping and configuration along with relative dimensions of the snag aperture 6 to the pawl member 4 will be such that there is in the order of a thirty degrees of angular range of rotation provided between the respective snag abutment positions of opposed actuator arrangements at which actuation of the respective functional mechanisms is achieved.

Figure 3:
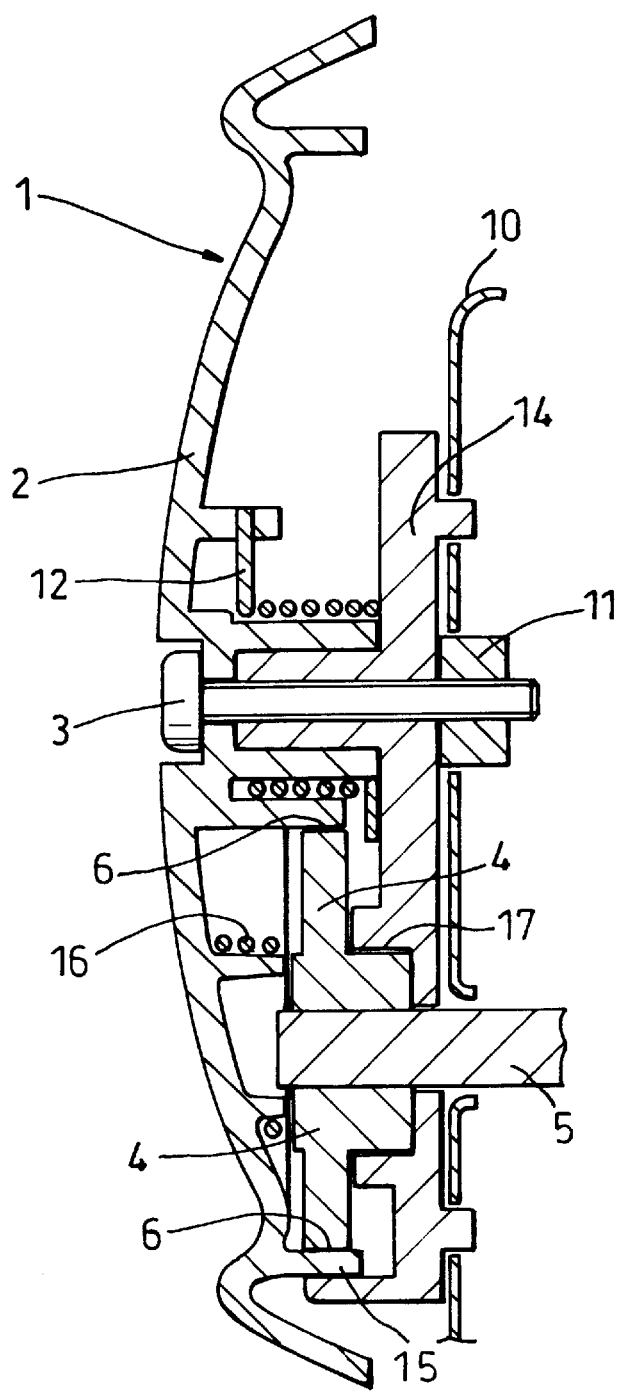
FIG. 3 is a cross-section of an actuator arrangement.

FIG. 3 illustrates in side cross-section an actuator arrangement in accordance with the present invention. Nomenclature from FIGS. 1 and 2 has been carried across for clarity.

Thus, the arrangement 1 is secured to a seat side frame 10 through a screw and nut 11 which acts as a centre 3 for rotation of the arrangement 1 as described previously. The handle member 2 rotates about that centre 3 such that a snag aperture 6 comes into snag abutment as described previously and therefore rotation of the member 2 about the centre 3 precipitates rotation of the actuator shaft 5 by coupling via the pawl member 4. A spring bias 12 is provided to return the handle member 2 to its lock or an intermediate position described previously after appropriate actuation rotation of the actuator shaft 5 and therefore release/operation of the functional mechanism coupled thereto.

In assembly, it will be noted that the actuator mechanism 1 is secured to the seat frame side member 10 through a carrier 14. This carrier 14 eases assembly by allowing an unstressed but snap-fit to the handle member 2 for a rear end 15 thereof. In such circumstances, the combination of the centre 3 and the snap fit 15 guiding along with a compression spring 16 act to ensure that smooth operation is achieved without yawing during rotation of the handle member 2. It will also be understood that the carrier 14 provides a sleeve 17 about the pawl member 4 which again acts to retain that pawl member 4 in appropriate association with the snag aperture 6.

As indicated previously, it is important that during respective handle member rotation to positions of snag abutment for coupling of handling member 2 rotation to the actuator shaft 5, that the pawl member should slide past or roll about its associated snag aperture. Thus, choice of materials of appropriately friction coefficient for slip or inclusion of suitable lubrication is necessary. However, it will be understood that particularly the pawl member should be resistant to wear and tear as a result of repeated operation. In such circumstances, it has been found that a glass filled Nylon is particularly suitable for the pawl member 4 but alternatively a steel pressing or similarly robust material may be used. Furthermore, the juxtaposed surfaces between the snag aperture 6 and the pawl member 4 may be packed with grease or be coated with a low friction material such as Teflon (RTM).

The actuator shaft 5 will typically have a square cross-section or any other positive device association to ensure good robust connection between that shaft 5 and the pawl member 4. Furthermore, it will be appreciated that the pawl member 4 may be adhered or welded or be an interference fit secured to the shaft 5. The shaft 5 may also include a knurled or threaded surface for further robust coupling with the pawl member 4.

Figure 4:
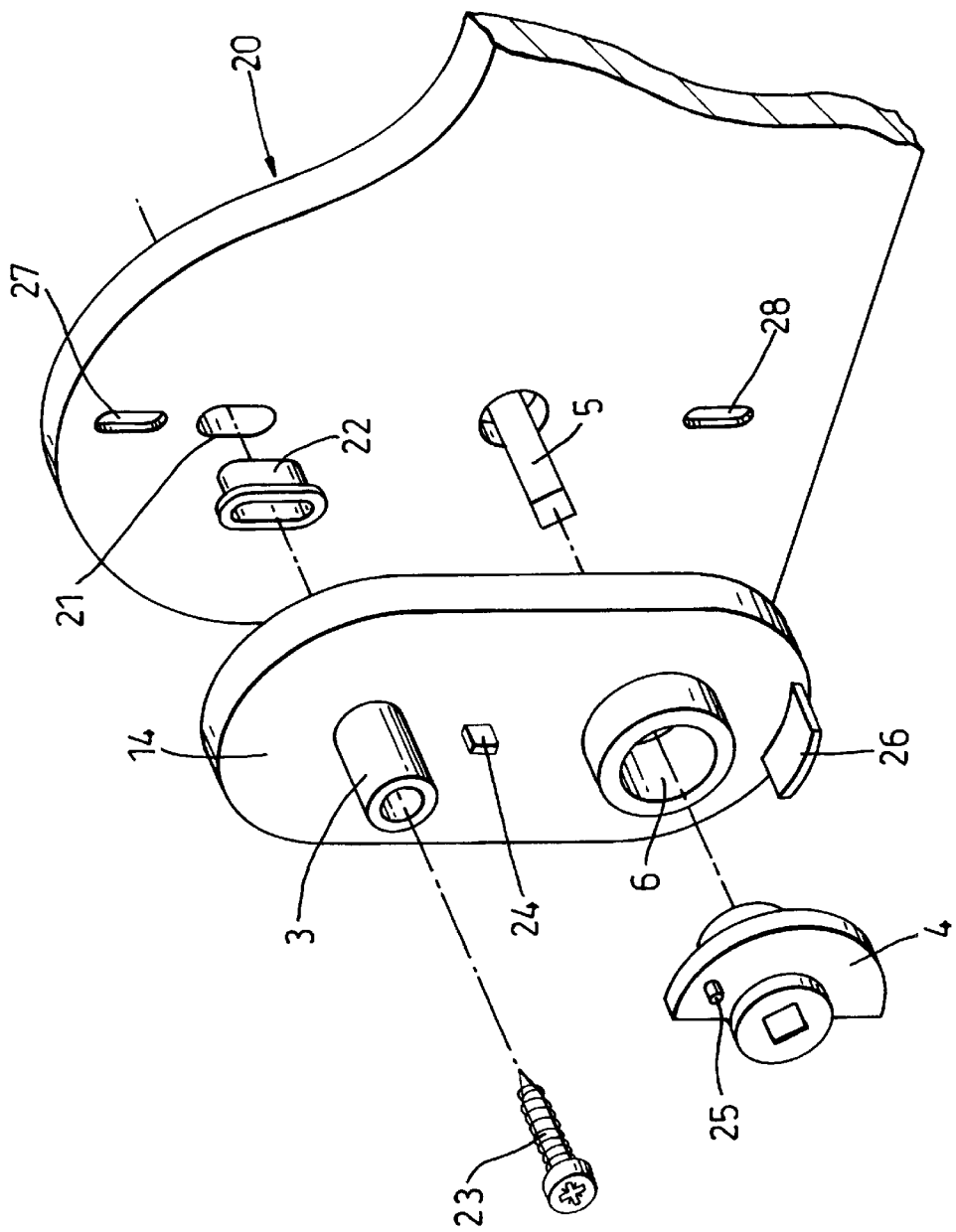
FIG. 4 is an exploded perspective view of an actuator shaft assembly to a motor vehicle seat frame.

FIG. 4 illustrates an exploded view of parts of the present actuator arrangement secured to a seat frame 20. Thus, the seat frame 20 includes a slot 21 and plug 22 arranged to receive a screw 23 for securing the handle member (not shown) and to constitute the centre 3 about which that handle member rotates in use. The screw 23 passes through the carrier 14 which also includes a reaction feature 24 against which the bias spring 12 reacts in order to return the handle member (not shown) to its lock or an intermediate position where free rotation of the shaft 5 is allowed as described previously.

Extending through the seat cushion frame 20 is the actuator shaft 5 which again passes through the carrier 14 in order to be secured to the pawl member 4. This pawl member 4 includes a compression spring post 25 which again as described previously with regard to FIG. 3 acts to return the pawl member 4 and therefore the actuator shaft 5 to an intermediate position without snag abutment between that pawl member 4 and a snag aperture 6 (not shown). At the bottom of the carrier 14 is a snap leg 26 which acts with the end 15 of the handle member 2 in order to present the snag aperture (not shown) to the pawl member 4 in use whilst allowing rotation of the handle member 2 about the centre 3.

The actuator shaft 5 passes through the frame 20 to be coupled with the respective functional mechanisms as described previously for slide/backrest forward fold and/or seat occupant tilt for comfort. These functional mechanisms are well known to those skilled in the art and as described previously require merely switch initiation for release/operation. This switch initiation is given by relatively marginal rotation, circa 15°, of the actuator shaft 5 as described previously.

In order to ensure resilient location of the carrier 14 and therefore the actuator arrangement in accordance with the present invention relative to the frame 20, it will be noted that recesses 27, 28 are provided which act as mortise receptacles for tenon fingers (not shown) at the rear of the carrier 14. In such circumstances, rotation of the carrier 14 along with the actuator arrangement in total is inhibited.

Figure 5:
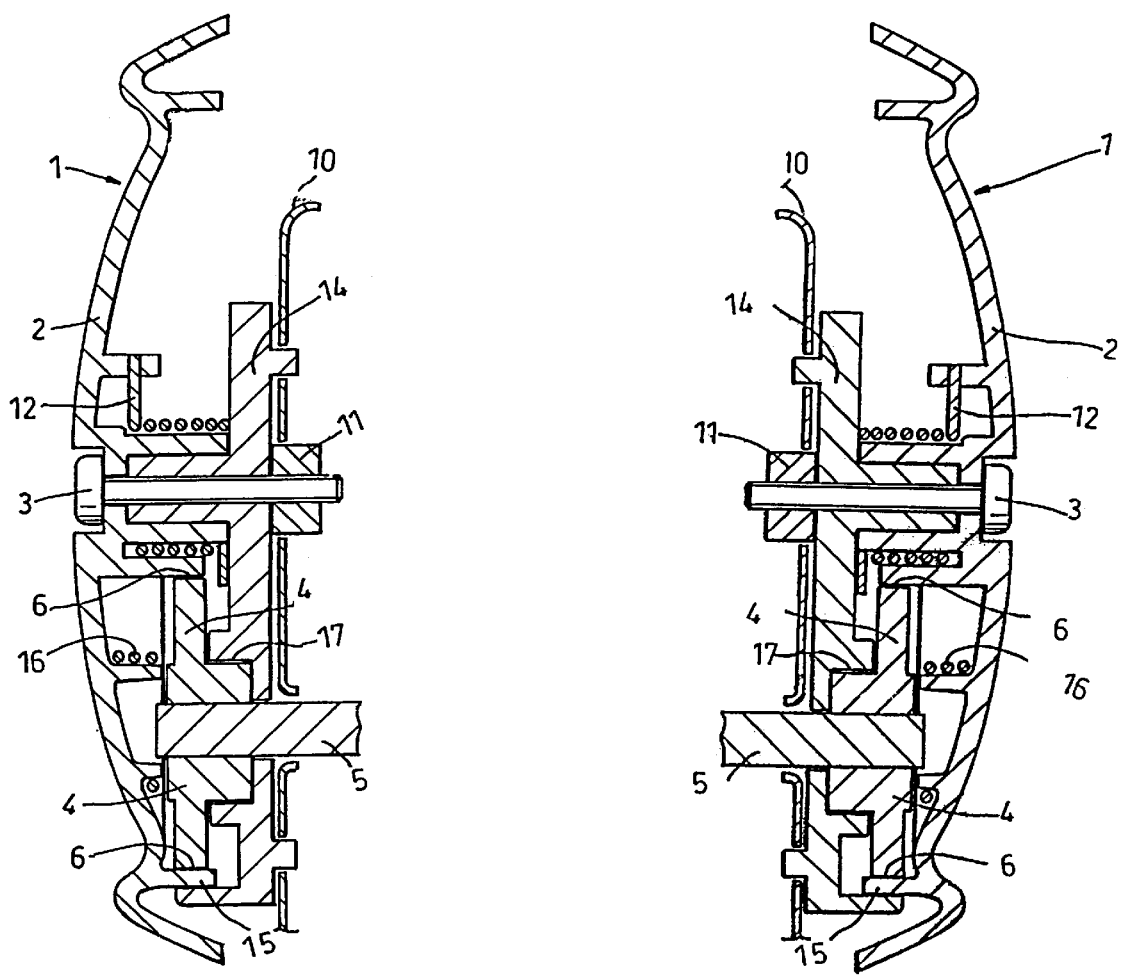
FIG. 5 is a cross-section showing a pair of actuator arrangements coupled to a common actuator shaft to form an actuator assembly.

It will be appreciated that respective actuator arrangements could be provided on either side of a motor vehicle seat, as can be seen in FIG. 5, such that one arrangement actuated the easy entry movements for that seat, ie. forward slide and back rest fold whilst the other arrangement controlled vehicle seat occupant comfort tilt. In such circumstances, the pawl member used in each respective arrangement is shaped whereby it snags with the snag aperture in order to operate its respective functional mechanism when rotated in one direction only. Thus, each actuator arrangement would only be operable with regard to its respective functional mechanism. It will be noted that, with such a two actuator arrangement combination or assembly upon a common actuator shaft 5, a bias return to an intermediate position for the handle member 2 and the pawl member 4 will ensure that the pawl member 4 can rotate solely under operation of one actuator arrangement without the other arrangement fouling rotation through it own snag abutment between its pawl member 4 and its snag aperture 6. In the intermediate position, it will be noted that the pawl member 4 would typically be central and, in any event, sized to allow free rotation if the shaft 5 is turned or driven by the functional mechanism and/or other actuator arrangement.

What is claimed is:

1. An actuator arrangement for a seat in a vehicle, the actuator arrangement comprising:

a handle member;

a pawl member; and an actuator shaft coupled to a functional mechanism, the handle member having a center and a snag aperture, the handle member being arranged to rotate about the center while the pawl member being arranged to rotate with and about the actuator shaft and being cooperative with the snag aperture such that rotation of the handle member, about the center, is substantially free until the pawl member engages with a portion of the snag aperture to achieve a snag engagement whereupon the handle member is coupled to the pawl member so that further rotation of the handle member about the center induces rotation of the actuator shaft to facilitate one of operation and release of the functional mechanism coupled to the actuator shaft.

2. The actuator arrangement according to claim 1, further comprising a bias means, wherein one of the handle member and the pawl member is appropriately biased to an intermediate position by the bias means such that the actuator shaft is substantially concentrically located within the snag aperture when the handle member is in a lock position.

3. The actuator arrangement as claimed in claim 1, further comprising an appropriate bias means, wherein one of the handle member and the pawl member is biased by the appropriate bias means to a position whereby the actuator shaft is non-concentrically displaced from a central position within the snag aperture when the handle member is in a lock position.

4. The actuator arrangement according to claim 1, wherein at least a portion of a surface of the pawl member includes a shape which mates with the portion of the snag aperture to achieve the snag abutment and couple further rotation of the handle member about the center to the pawl member and facilitate one of operation and release of the functional mechanism coupled to the actuator shaft.

5. The actuator arrangement according to claim 1, wherein the actuator shaft is configured to have a positive drive coupling with the pawl member.

6. The actuator arrangement according to claim 5, wherein the positive drive coupling is provided by a substantially square shaped cross-section for the actuator shaft to facilitate coupling between that actuator shaft and the pawl member.

7. The actuator arrangement according to claim 1, wherein the pawl member has a generally truncated circle transverse cross-section.

8. The actuator arrangement according to claim 7, wherein the truncated circle has a diameter which is no larger than one of a notional rotational diameter and a base circle of the snag aperture.

9. An actuator assembly comprising two actuator arrangements, each of the two actuator arrangements comprising:

a handle member;

a pawl member; and an actuator shaft coupled to a functional mechanism, the handle member having a center and a snag aperture, the handle member being arranged to rotate about the center while the pawl member being arranged to rotate with and about the actuator shaft and being cooperative with the snag aperture such that rotation of the handle member, about the center, is substantially free until the pawl member engages with a portion of the snag aperture to achieve a snag engagement whereupon the handle member is coupled to the pawl member so that further rotation of the handle member about the center induces rotation of the actuator shaft to facilitate one of operation and release of the functional mechanism coupled to the actuator shaft;

wherein the pawl members of the two actuator arrangements are secured to a common actuator shaft for one of release and operation of the respective functional mechanisms.

10. The actuator assembly according to claim 9, wherein rotation of each handle member, to achieve snag engagement between the s nag aperture with the associated pawl member, induces one of release and operation of only a single one of the functional mechanisms coupled to the actuator shaft.

11. The actuator assembly according to claim 10, wherein the actuator arrangement is used in combination with a seat for a motor vehicle.

* * * * *